United States Patent

[11] 3,616,861

[72] Inventor Thomas S. Bettencourt, Jr.
Walnut Grove, Calif.
[21] Appl. No. 837,814
[22] Filed June 30, 1969
[45] Patented Nov. 2, 1971
[73] Assignee The Regents of the University of California
Berkeley, Calif.

[54] PICKUP DEVICE FOR ROW-CROP HARVESTING
11 Claims, 15 Drawing Figs.
[52] U.S. Cl. .................................................... 171/101
[51] Int. Cl. ........................................................ A01d 17/00
[50] Field of Search ............................................ 171/27,
101, 105, 89, 106

[56] References Cited
UNITED STATES PATENTS

| | | | |
|---|---|---|---|
| 2,523,024 | 9/1950 | Jenkins | 171/89 |
| 2,581,661 | 1/1952 | Hume | 171/105 |
| 2,597,218 | 5/1952 | Appel | 171/89 |
| 2,718,110 | 9/1955 | Butler | 171/89 |
| 3,078,926 | 2/1963 | Ries et al. | 171/101 |
| 3,436,902 | 4/1969 | Gates et al. | 171/101 |

Primary Examiner—Antonio F. Guida
Attorney—Owen, Wickersham & Erickson

ABSTRACT: For use with a pickup device for harvesting row crops, such as tomatoes, having a below ground cutting blade followed by a continuous conveyor having a forward end lying rather close to the ground which picks up the harvested plants and carries them rearwardly and upwardly to a separation zone; an assist means lies above the forward end and has a lower surface moving rearwardly. In combination with these, the invention provides a spinner, a rotating bar with a plurality of radially extending flute-edged ridges mounted ahead of and below the forward end of the conveyor and driven at half the speed of the conveyor. Depending upon the soil conditions, the spinner may ride almost entirely above ground or with most of it below ground. After the knife severs the roots, the spinner lifts up the plant and carries it over and deposits it on top of the conveyor and beneath the assist means. In harvesting in wet soil, the spinner lifts only the plants, leaving detached fruit on the ground, picking up very little mud, and not passing mud on to the conveyor. In dry ground, the spinner may be used at a lower level to pick up the detached fruit from the ground and the fruit on the plants, as well as some loose dirt, and the spacing of the spinner relative to the conveyor is such that all dirt smaller than the fruit being harvested is returned to the soil, whereas the crop, the fruit that was loose, and dirt clods larger than fruit size are carried up the conveyor for later separation.

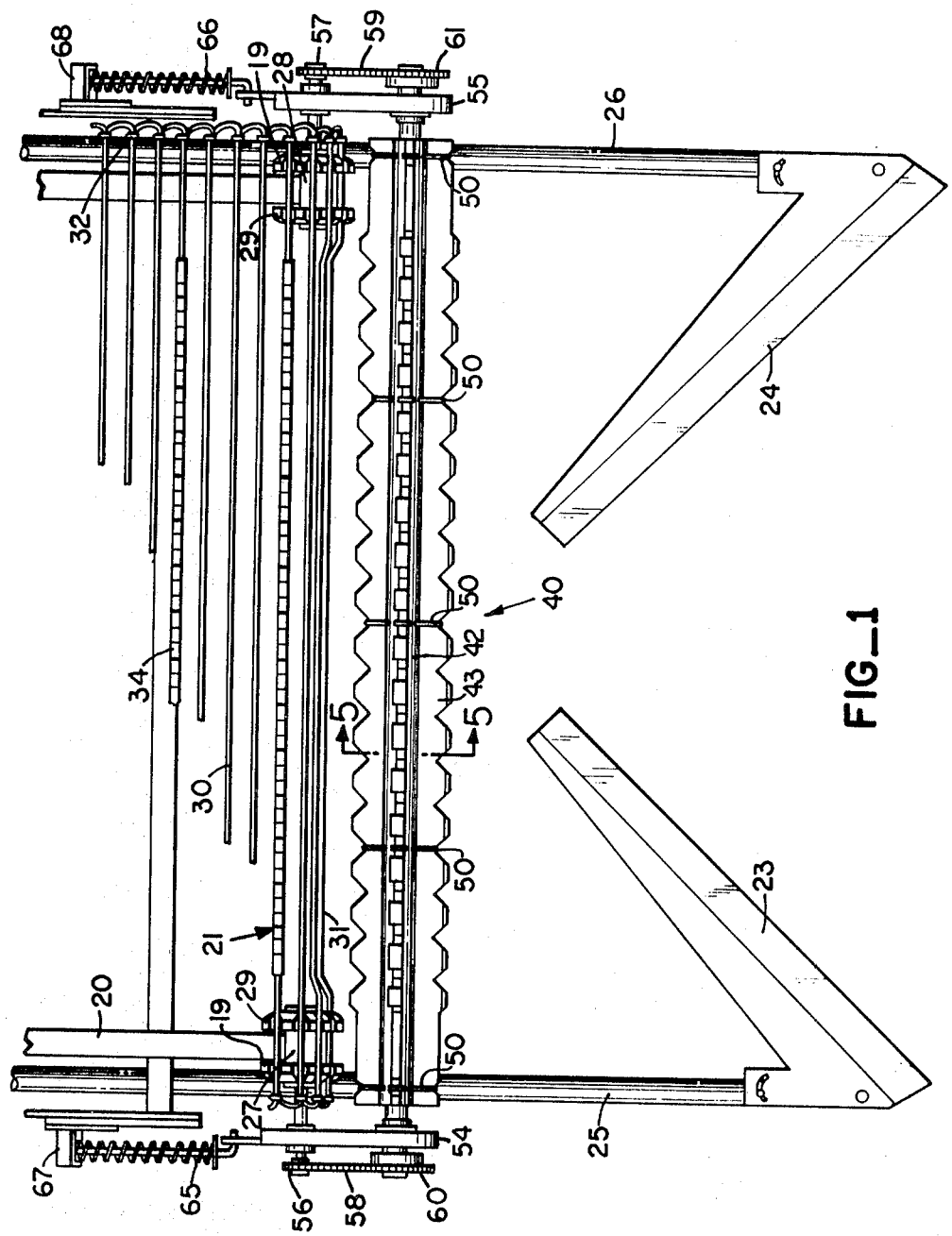

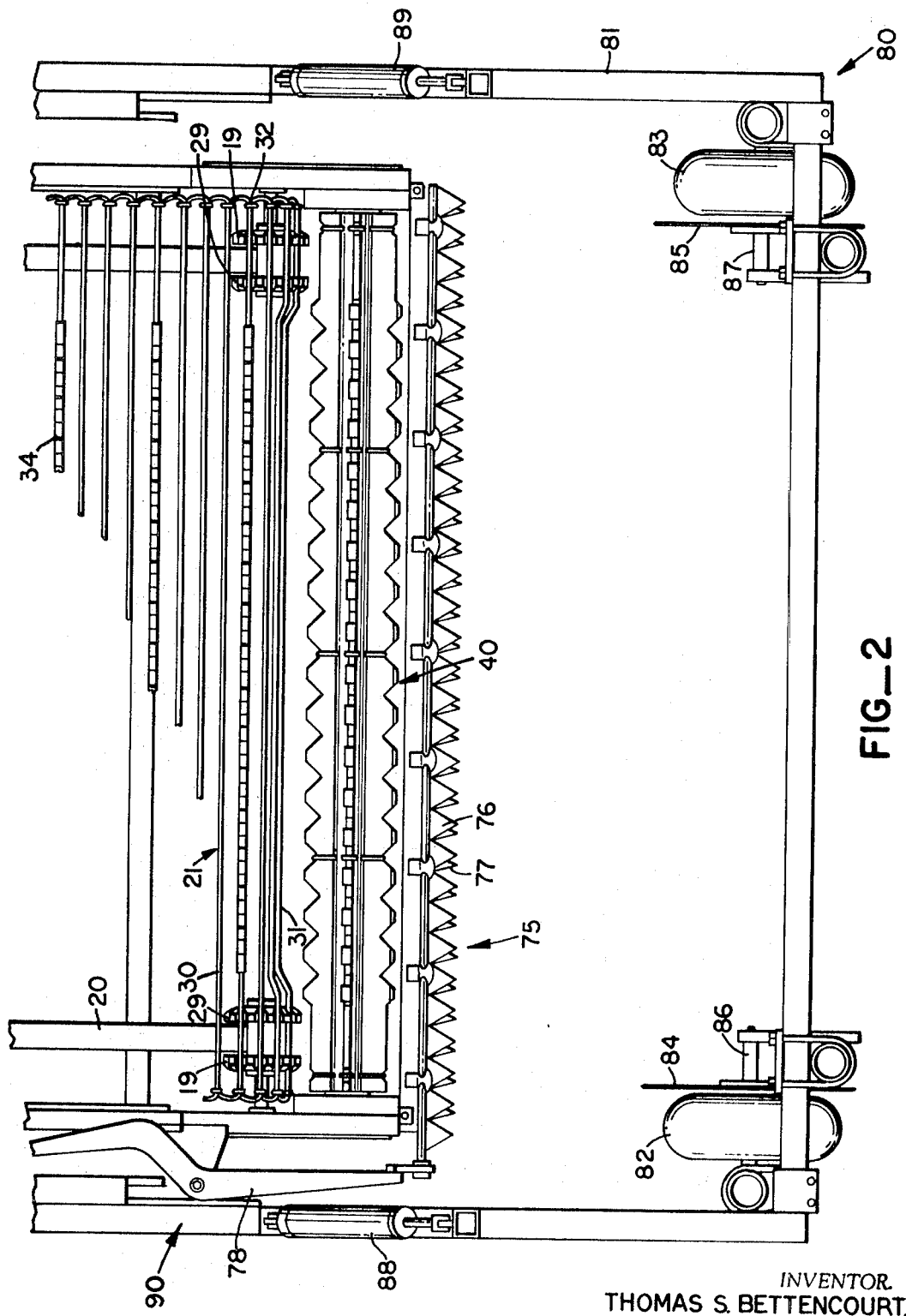

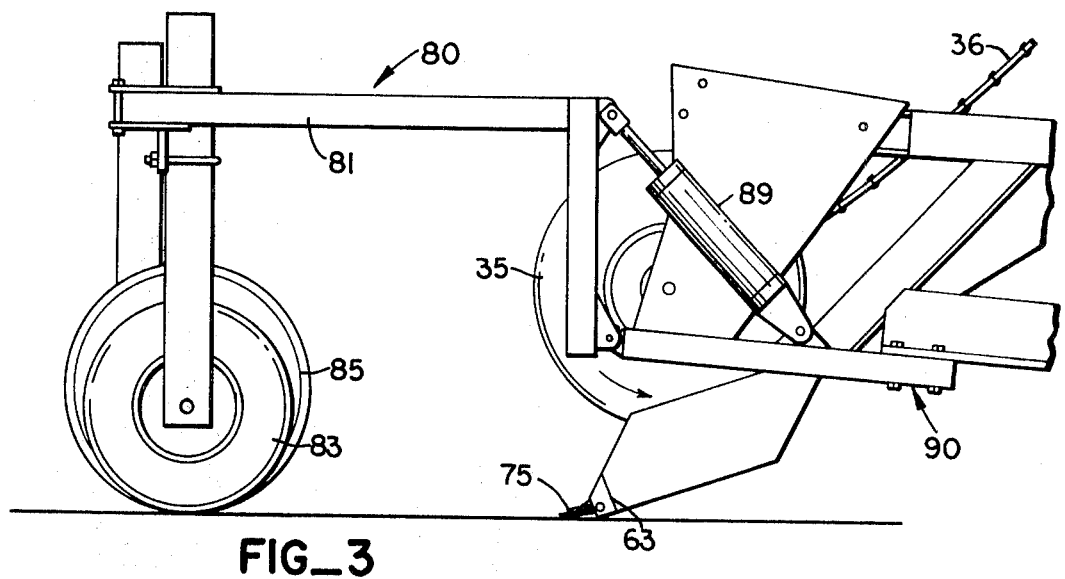
FIG_3
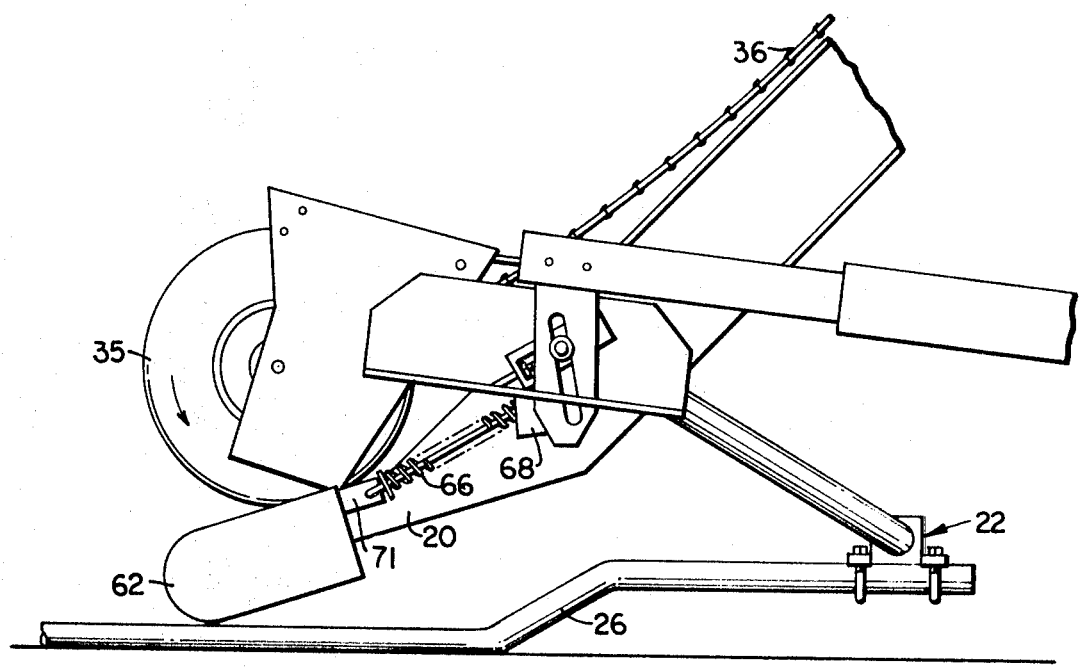
FIG_4

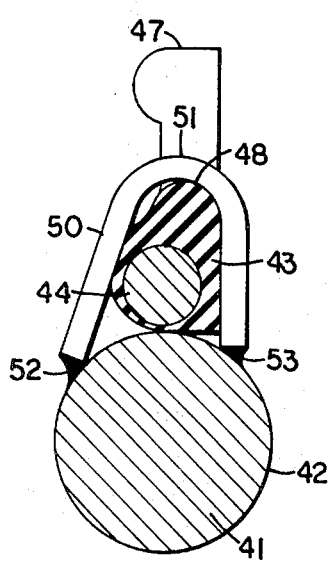
FIG_8
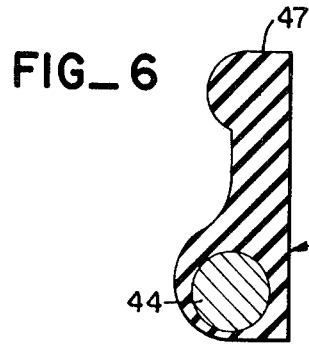
FIG_6
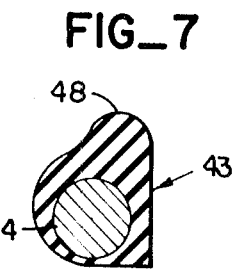
FIG_7
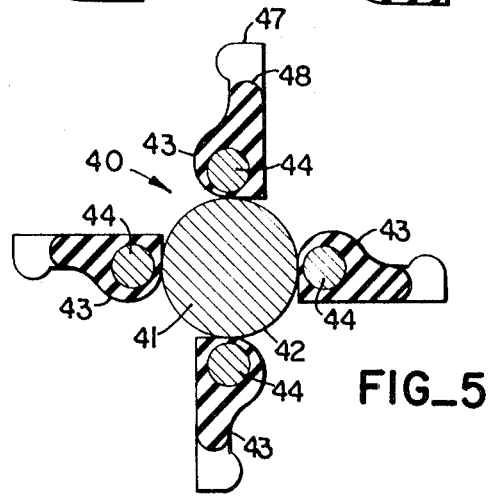
FIG_5
FIG_9
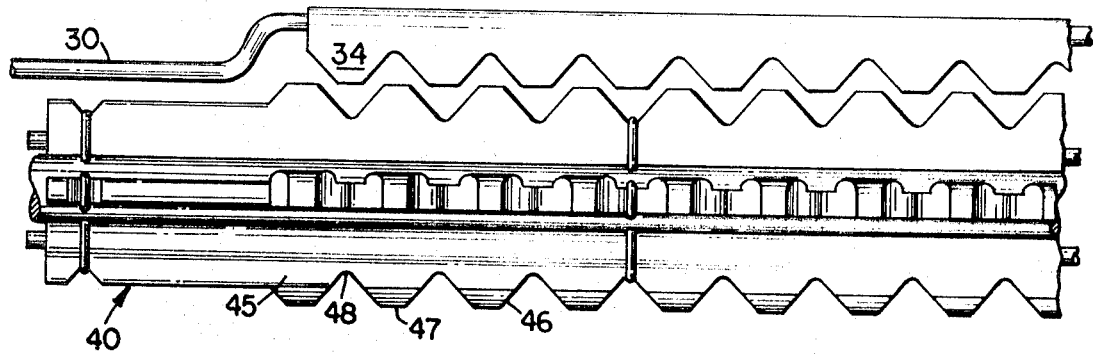
FIG_10
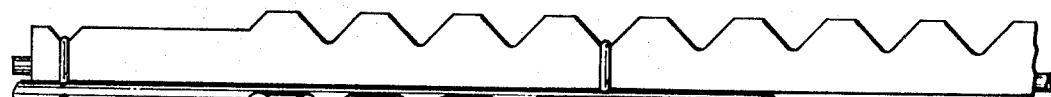
INVENTOR.
THOMAS S. BETTENCOURT, JR.
BY
Owen, Wickersham & Erickson
ATTORNEYS

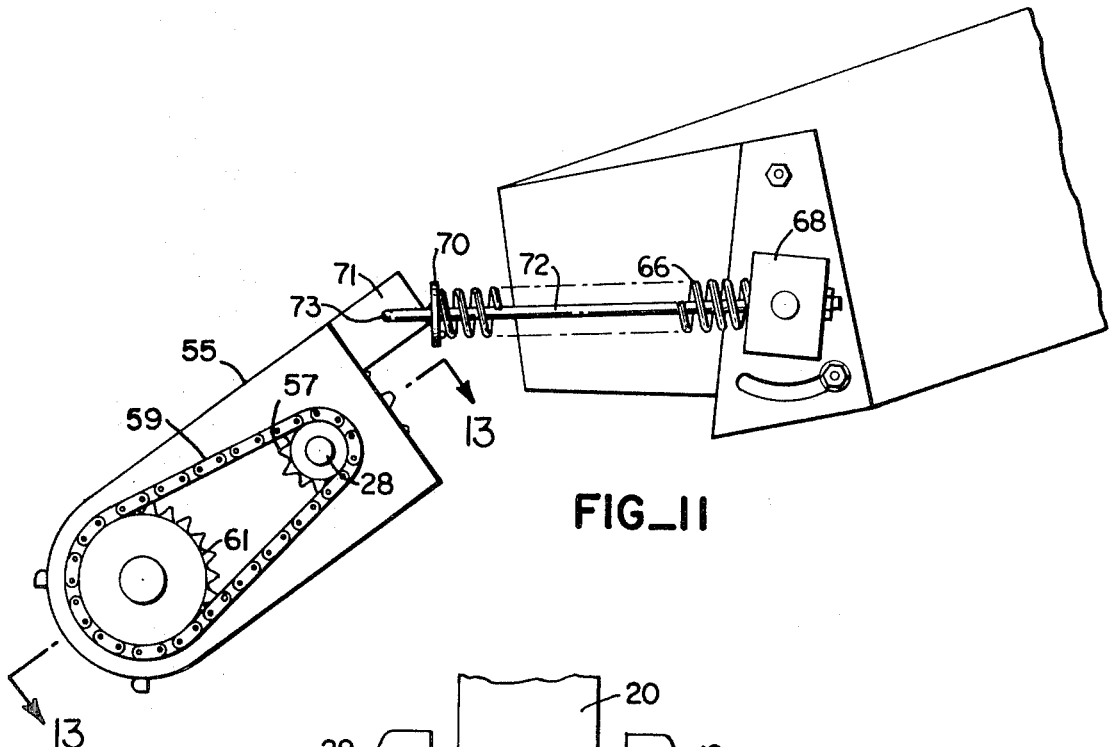
FIG_11
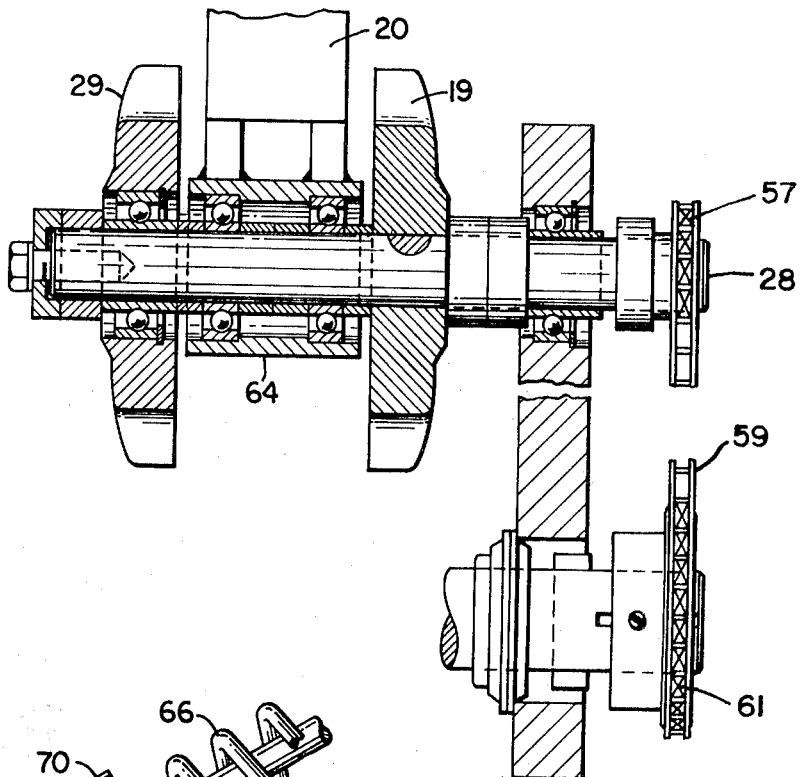
FIG_13
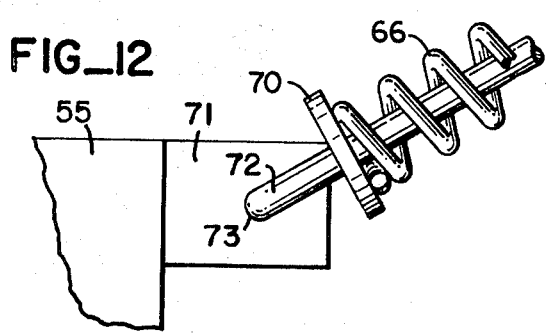
FIG_12
INVENTOR.
THOMAS S. BETTENCOURT, JR.
BY
Owen, Wickersham & Erickson
ATTORNEYS

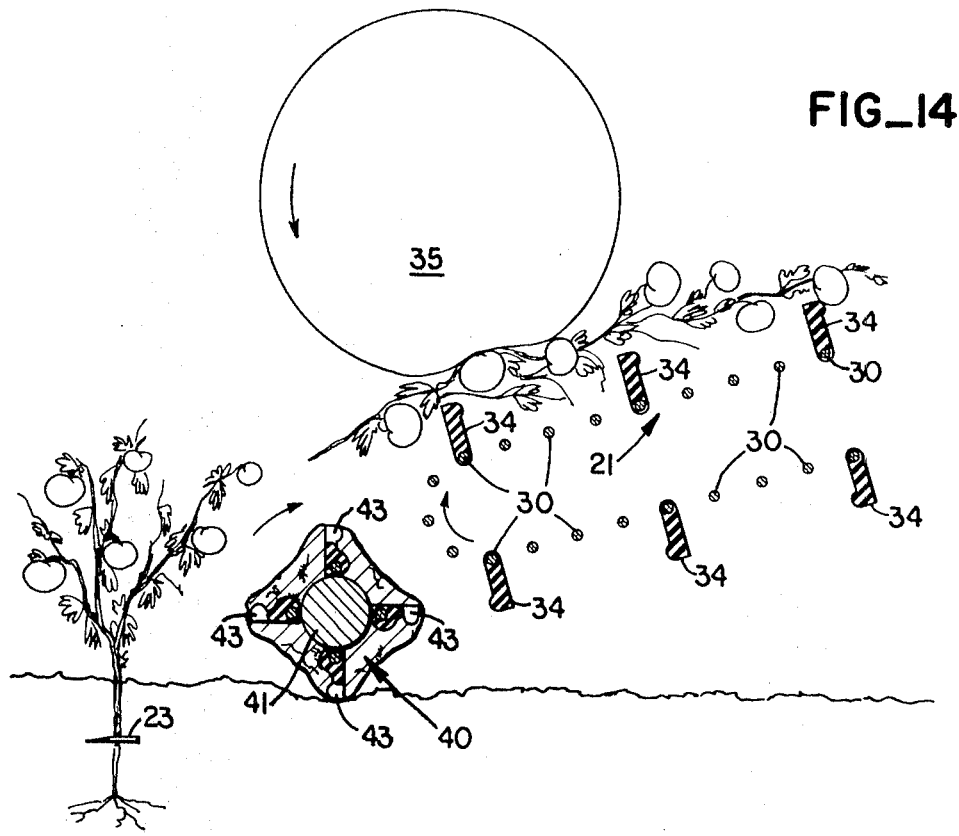
FIG_14
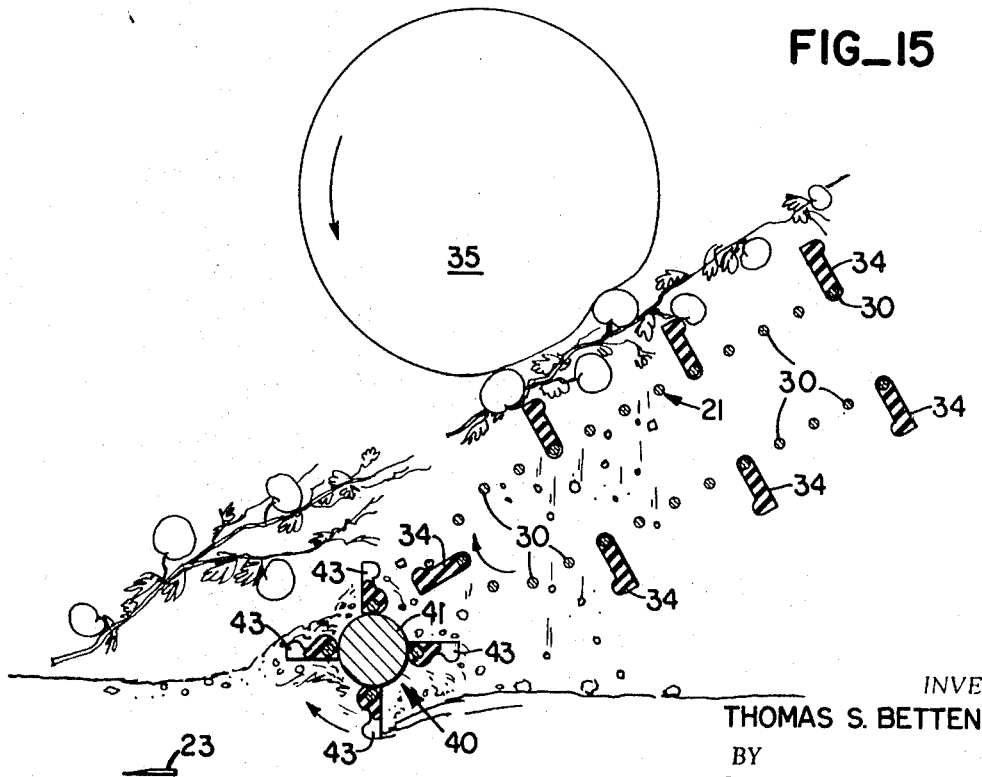
FIG_15
INVENTOR.
THOMAS S. BETTENCOURT, JR.
BY
Owen, Wickersham & Erickson
ATTORNEYS

PICKUP DEVICE FOR ROW-CROP HARVESTING

This invention relates to pickup device for row-crop harvesters.

The apparatus of this invention is particularly useful in harvesting tomatoes and will be described in connection therewith, but it also may be used for other row-crop harvesters where similar problems prevail.

One of the problems to which this invention is directed is that of harvesting in wet fields. In areas which grow tomatoes for canning, it is preferred to do the harvesting in a dry field. In fact, it is better to stop all watering long before the harvesting. However, sometimes it rains before the crops can be harvested, and then it becomes necessary to consider harvesting in the wet field. Heretofore, none of the mechanical tomato harvesters were able to operate properly in wet fields. Most tomato harvesters could go only a few feet before becoming completely plugged with mud. Harvesters of the types which dig up a layer of dirt and carry it with the plants onto the conveyors were severely restricted in performance in wet fields. Tomato harvesters which avoided picking up dirt, were able to work in some wet fields but not when the field was quite muddy. All mechanical harvesters heretofore in use were unsuccessful in fields that were very wet and muddy. They became plugged with mud; their conveyors became sheets of mud, and if there was any operation at all, the fruit they delivered to the sorting table was dirty, muddy, and mixed in with a great deal of mud. In most cases operation stopped because the mud prevented the movement of the conveyors.

The present invention has solved this problem and has made operation in muddy fields feasible and satisfactory, although, of course, dry conditions are still to be preferred. The harvester of this invention enables the farmer who has a rain just at the time when harvesting should be done to go ahead and harvest instead of losing his crop or having to rely on a sudden call for hand labor.

Other problems which the invention solves apply to harvesting under dry conditions. Here, the best tomato harvesters heretofore in use had avoided picking up dirt as much as possible in order to keep the operation clean. Even so, the pickup had to ride close to the ground, and the knives which severed the fruit did cause ground swells which inevitably sent a significant amount of dirt into the system and tended to cause problems later on. Also, some of the farmers tended to object to the fact that ripe, undamaged fruit which fell to the ground or was knocked off the plant by the action of the knives severing the main stems and the roots, was lost and not recoverable in this type of harvester; then farmers tended to compare this type of harvester unfavorably with the other harvesters which picked up the dirt and everything else on the bed. The advantages of clean operation were usually admitted, but the failure to recover otherwise recoverable fruit was pointed to as being a more serious disadvantage than those possessed by the other type of harvester.

The present invention under dry conditions makes it possible to pick up most of the fruit which has fallen to the ground, to deposit it on the conveyor and to carry it up to the separation device. At the same time, it eliminates the necessity for carrying the vast amount of dirt which other competing machines have had to do in order to recover detached fruit. The invention enables a rapid and early separation of all dirt particles and clods smaller than the size of the fruit being harvested. The large clods have not been a very serious problem, for they are easily removed by the sorters, for there are not many of them, and they are a good size for a sorter to pick up with his hands and toss into the cull chute.

Basically, the invention combines with the pickup and assist mechanism of the type shown in U.S. Pat. No. 3,436,902, a spinner assembly comprising a plurality of radially extending flute-edged ridges mounted on a central axial bar extending across the machine just in front of the forward end of the conveyor and slightly below it, the height being determined by the field conditions. The spinner is rotated preferably at about half the speed of the pickup conveyor and its flute-edged ridges are constructed to mate with and nearly mesh with the similar bars used as flight bars on the conveyor. The clearance between the spinner bars and the flight bars is sufficient to let loose dirt pass through even when they are closest, and the clearance between the spinner and the other round bars of the conveyor is small enough so that the fruit being harvested cannot fall through between them. As a result, substantially all of the fine dirt and small clods are eliminated as they pass over the gap between the spinner and the front end of the conveyor, whereas the tomato vines or similar plants carry their fruit with them. When loose fruit is being picked up, it is also carried along, as are those large clods which are at least as large as the fruit being harvested.

Other objects and advantages of the invention will appear from the following description of some preferred forms thereof.

In the drawings:

FIG. 1 is a fragmentary top plan view of the forward end of a tomato harvester of the type shown in U.S. Pat. Nos. 3,199,604, 3,252,520, and 3,353,342, having incorporated thereon a spinner assembly embodying the principles of the present invention.

FIG. 2 is s similar view of a modified form of harvester having a sickle bar on the front edge of the pickup unit and gauge wheels extending in front of the pickup unit; this pickup unit also incorporates the principles of the present invention.

FIG. 3 is a view in side elevation of the harvester of FIG. 2.

FIG. 4 is a view in side elevation of the frond end of the harvester of FIG. 1.

FIG. 5 is an enlarged view in section of the spinner, taken along the line 5—5 in FIG. 1.

FIG. 6 is a further enlarged view in section of one of the spinner bars, taken in section at its widest portion.

FIG. 7 is a view similar to FIG. 6 of the same spinner bar shown in section at its narrowest portion.

FIG. 8 is a view in section of partially assembled spinner embodying the principles of the invention, showing one spinner bar and its supporting member.

FIG. 9 is a fragmentary top plan view of a spinner and the front end of a conveyor, showing the closest point to meshing between the spinner bars and the flight bars on the conveyor.

FIG. 10 is a similar view showing the most distant point at which the spinner lies from the conveyor bars.

FIG. 11 is an enlarged fragmentary view in side elevation of an assembly of this invention according to FIG. 1.

FIG. 12 is an enlarged view in section of a portion of FIG. 11.

FIG. 13 is an enlarged fragmentary view in elevation and in section of a portion of the spinner showing the bearing supports. FIG. 14 is a view in elevation and in section and partly diagrammatic of the front end of the conveyor, the spinner, and the assist, shown in operation in a muddy field.

FIG. 15 is a view to FIG. 14 showing operation of the same elements in a dry field.

FIGS. 1 and 4 show a fragment of a tomato harvester of U.S. Pat. No. 3,436,902 adapted to the present invention. A pickup frame 20 supports a pickup conveyor 21, and a cutter frame 22 (which can move relatively to the frame 20) supports a cutter assembly, which may comprise a pair of blades 23 and 24 that move below ground to sever the plants form their roots. The cutter may be the one shown in U.S. Pat. No. 3,196,954, in which the blades 23 and 24 are each mounted on rods 25 and 26 which extend out forwardly from the frame 22. The blades 23 and 24 move below ground to sever the main stem, preferably just above the roots.

The pickup's continuous conveyor 21 turns around two narrow-diameter front sprocket shafts 27 and 28, each with sprocket wheels 19 and 29. The conveyor 21 is composed of a series of interlocked metal bars 30 which are formed with an inwardly recessed portion 31, as per U.S. Pat. No. 3,353,342 and are interlocked at each end 32 to make in effect a pair of continuous chains out of the ends 32 of these interlocked bars 30. The sprocket wheel 19 in the conveyor 21 may simply be an idler like the sprocket wheel 29 (or the driver for the spinner 40 described below). The conveyor 21 may be driven from a set of sprocket wheels at the opposite end of the conveyor 21.

About every fourth bar 30 in the conveyor 21 may be a flight bar 34 provided with elastomeric flat ridges having a serrated edge, as in U.S. Pat. No. 3,353,342. (See FIG. 9.) These flight bars 34 assure that the plants are lifted rather than allowed to slide down a row of smooth bars. The 30 in the upper flight move to the rear and upwardly to elevate the tomato or other row crop to a separating device where the fruit is separated from the plant. The return or lower flight moves downwardly and forwardly to the front end.

The assembly shown in FIGS. 1 and 2 omits an assist device 35 like that of U.S. Pat. No. 3,436,902 which is shown in FIGS. 3 and 4, and also in FIGS. 14 and 15 in somewhat diagrammatic form. This assist device 35 normally consists of a set of readily depressible large cylindrical tires that give readily, rather than forcing too hard on the fruit, but do help the fruit to get on to the conveyor 21 and to continue moving upwardly instead of being forced off by the movement at the front end of the conveyor. The assist device 35 is driven so that the lower half of its cylindrical surface moves rearwardly.

The conveyor 21 is preferably driven at approximately ground speed, so that so far as the plant is concerned, there is no substantial forward or rear movement but simply an elevating. This is in order to be gentle with the plants, so that the fruit will not accidentally become detached before it reaches the separation stage where it is purposely detached. The assist 35 preferably moves at the same speed and preferably includes a chain 36 overlying the central portion of the conveyor 21, which is used not only to drive the assist 35 but also to help hold the plants down and on the conveyor 21.

In the present invention a spinner assembly 40 is combined with the elements described. The spinner assembly 40 comprises a central rod or tube 41 to the preferably cylindrical outer surface 42 of which are secured a plurality of generally flat paddles 43 extending radially outwardly. These paddles 43 may be made as shown in FIGS. 5 through 8 from a straight metal rod 44 and a plurality of generally flat elastomeric members 45, such as synthetic rubber in the shape shown. As shown in FIGS. 1, 9, and 10, the members 45 may have a serrated or fluted edge 46 providing a series of projections 47 and recesses 48, the recesses 48 preferably being V-shaped and the projections 47 preferably being approximately trapezoidal in shape. The shape and structure of the elastomeric member 45 preferably corresponds to and is substantially identical to that of the flight bars 34 used in the conveyor 21.

As can be seen from FIGS. 1 and 8, the paddles 43 are preferably secured in place on the rod 41 by generally V-shaped bar brackets 50, whose bowl 51 fits snugly in a recess 48 and whose ends 52 and 53 are welded to the surface 42. There may be several groups of these brackets 50.

As shown in FIGS. 1 and 11, the sprocket shafts 27 and 28 are extended from the frame 20 and outside end plates 54 and 55 to carry sprocket wheels 56 and 57 that may be about half the size of the sprocket wheels 29. There, sprocket wheels 56 and 57 drive chains 58 and 59, and the rod 41 carries at each end larger sprocket wheels 60 and 61, that may be as large as the sprocket wheels 29. For protection, these assemblies may be enclosed in dirt-protective housings 62 and 63, as shown in FIGS. 3 and 4. The end plates 54 and 55 support the spinner 40 in antifriction bearings 64. As a result of the sprocket wheels 60 and 61 being about twice as large as the sprocket wheels 56 and 57, the spinner 40 rotates at about half the speed of the conveyor 21. This is important, for it gives a relative speed and prevents over-paddling the fruit.

As shown in FIG. 9, the flat spinner paddles 43 and the flat flight bars 34 nearly, but not quite, mesh at the point where they come closest to each other; whereas, as shown in FIG. 10, the normal round conveyor bars 30 lie further away. The relationship is further shown in FIGS. 14 and 15. The preferable dimension is such that the furthest spacing, as in FIG. 10, is enough to retain fruit from some desired size up, so that it cannot fall through this space. The smallest size is preferably the largest that can be gotten with such results, so that dirt can still fall through. Thus, clods of dirt that are smaller than the fruit size desired to be harvested nearly always fall all the way through back to the earth; the few that may pass on generally fall in between the bars 30 of the conveyor 21 and drop out to the ground. The intention is that all the fine dirt pass through in the gaps between the spinner 40 and the front end of the conveyor 21. Springs 65, 66 are connected between the end plates 54, 55 which support the spinner and brackets 67, 68 on the main frame 20 of the conveyor 21. The springs 65, 66 may be a type of coil spring; they enable a certain amount of swinging motion of the end plates 54 and 55 and therefore enable the spinner 40 to move up and down relatively to the front end of the conveyor 21.

The purpose here is that when the harvester is operating in a dry field, it may ride over the field and accommodate the bumps made so that it may go up and down relative to both the blades 23, 24 and to the conveyor 21, to accommodate the small roughnesses that naturally occur in such fields. There is a limit to such movement, established by the relative position of a plate 70 on each spring 65, 66 and a projecting member 71 on each end plate 54, 55, which prevents movement beyond the two limits shown in FIGS. 11 and 12. The plate 70 carries a bent rod 72 that is pivoted in an opening 73 through the member 71. The springs 65, 66 urge the end plate down to its previously set position, as shown in FIG. 11, except when overcome by ground pressure.

FIGS. 2 and 3 show a somewhat different type of harvester, in which the invention may also be used, but for dry-field operation only. In this form of the invention there is no spring 65, 66 or permissible relative movement, and the spinner 40 is located just to the rear of a sickle bar 75, in which one knife blade 76 is driven back and forth relative to another blade 77, or both blades 76 and 77 are driven back and forth relative to each other by a crank arm 78 so as to snip off stems that lie in between. This sickle bar 75 is made to ride just below the ground and to cut off the roots of the tomato plants, and therefore there is no need to have a variation in altitude for this form of the invention. The height of the sickle bar 75 is maintained by a gauge assembly 80 comprising of a forward-extending frame 81 having a pair of gauge wheels 82 and 83 at the outer side and a pair of coulter wheels 84 and 85, all wheels being suspended on stub shafts 86 and 87 forward of the sickle bar 75. A frame 90 is provided with a pair of hydraulic cylinders 88 and 89 and pistons for changing the relative height between the pickup frame 20 and the gauge tires 82, 83 and therefore the relative depth at which the sickle bar 75 extends into the soil and at which the spinner bar 40 extends into the soil.

In operation in a muddy field, what happens is shown substantially in FIG. 14. The blade 23 moves underneath the ground and is severing the stems of the plants to be harvested. In mud, the cutters must be a blade, such as the kind used in FIG. 1, rather than a sickle bar. The spinner 40 is below the level of the forward end of the conveyor 21 and at the spacing already described. As it rotates at about half the speed of the conveyor 21, it picks up the plants which have been severed and brings them over itself and onto the conveyor 21 just beneath the assist roller 35 so that the conveyor 21 and the assist roller 35 act together to take hold of the plant and deposit it firmly on the pickup conveyor 21. The flight bars 34 are shown clearly in this view. Since the field is muddy, it is desired not to pick up mud and plug the conveyor. The height at which the conveyor 21 is driven would be totally unsuited to picking up plants were it not for the spinner 40, but the spinner 40 itself, being separated from the conveyor 21, accommodates the muddy conditions without getting the conveyor 21 muddy. As shown in FIG. 14, the spinner 40 rides over and slightly into the muddy ground and it therefore picks up some mud. But it has been found in experience that this mud, through attrition between the mud and the soil, never extends any substantial amount beyond the flat paddles 43. The mud tends to build up and seems to web between the flat paddles 43, shown in FIG. 14. Since the mud is retained in the spinner, and since the spacing is maintained, no efficiency seems to be sacrificed in picking up the crop. Further, there is only a very small buildup of mud, which can be cleaned off from time to time, usually no more than once a day.

A feature of the invention when it is used in muddy fields is its handling of the tomatoes that are on the ground. Under these conditions, the tomatoes on the ground are almost all mildewed or muddy or are otherwise undesirable and it is certainly not intended that they should be picked up. When this condition occurs, the operator elevates the spinner 40 and the conveyor 21 just high enough to leave this unwanted product on the ground while still enabling the vine and its attached fruit to be picked up.

In dry-field operations, conditions become quite different, for there is no mud problem, or at least only a minor one. In this instance, the spinner 40 is run at a lower level, as is shown, in FIG. 15, riding in the ground swell so that approximately the top of the center bar 41 is buried and only one or two of the paddles 43 at a time are exposed. In this instance the spinner 40 picks up the dirt somewhat in the manner of those tomato harvesters that pick up the dirt with the crop, but with this difference: in transferring the dirt to the conveyor 21, the spacing between the spinner 40 and the conveyor 21 provides an exit for all dirt particles and clods which are smaller than the fruit size and therefore smaller than the clearance between the conveyor 21 and the spinner paddles 43. While this clearance size varies, it also varies fast enough so that very few dirt particles smaller than the size of the fruit being harvested are picked up by the conveyor 21 and most of those fall through between the conveyor bars 30 in the next few inches. The majority of loose dirt falls out right between the spinner 40 and the conveyor 21. Large clods are of course picked up and carried, but these have never been the problem that the smaller dirt has been because they are fewer, are obvious and apparent, and are readily removed at the culling station.

Test harvesting has shown that not only does the device make it possible to harvest wet fields which could not be harvested at all before but that in dry fields better recoveries and cleaner recovery are simultaneously obtained. The canners like this, because they get a cleaner crop which causes less trouble to them, and the growers like it because they get more fruit and therefore better recovery.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A pickup device for row-crop harvesters including in combination:
    a continuous conveyor comprising a series of spaced-apart flight bars and other bars, said flight bars projecting above said other bars, and providing a rearwardly and upwardly moving upper flight and a forwardly and downwardly moving return flight and having a forward end closely adjacent ground level but above it,
    assist means above said forward end and having a lower portion moving rearwardly,
    a cutter in advance of said forward end for severing plant stems underground,
    a spinner forward of and below and spaced from said forward end and rearwardly of the cutter and comprising a plurality of flat paddles extending out from a central cylindrical member extending crosswise of the harvester, said spinner lying close to said forward end so as not quite to mesh with the flight bars thereof, with a gap therebetween, and to be spaced from said spaced-apart other bars at a maximum distance no greater than the size of the fruit which is to be harvested, and
    means for rotating said spinner so that its upper half moves rearwardly and directs material between the forward end of the conveyor and the assist means,
    whereby said spinner makes contact with said row crop and lifts it on to said conveyor front end in between said conveyor and said assist means while dirt carried over by the spinner drops into the gap between the spinner and the conveyor.

2. The device of claim 1 wherein said spinner paddles and said flight bars are both of the serrated type with projecting trapezoidal portions and generally V-shaped recesses, with the bars and paddles so aligned that the projections of the spinner paddles when they come closest to the flight bars pass through and are spaced from the V-shaped recesses of the flight bars.

3. The device of claim 1 wherein the means for rotating said spinner comprises means for driving said spinner at approximately one-half the speed of the conveyor.

4. The device of claim 3 wherein the conveyor has means for moving it substantially at the ground speed of the harvester in the opposite direction from the ground speed of the harvester, so that the spinner is moved at approximately one-half of the ground speed of the harvester.

5. The pickup device of claim 1 having means for varying the height between said spinner and said forward end, according to ground conditions.

6. The device of claim 5 wherein spring means is provided for tending to restore said spinner to a lower set position, while enabling it to rise against the pressure of the spring to a fixed limit depending upon the ground-resisting conditions.

7. In a pickup device for row-crop harvesters having
    a continuous conveyor comprising a series of spaced-apart flight bars and other bars, said flight bars projecting above said other bars, and providing a rearwardly and upwardly moving upper flight and a return flight and having a forward end closely adjacent and above ground level and having assist means above said forward end, with a lower portion moving rearwardly, the combination therewith of
    assist means above said forward end and having a lower portion moving rearwardly,
    a cutter in advance of said forward end for severing plant stems under ground,
    a spinner forward of and below and spaced from said forward end and rearwardly of the cutter and comprising a plurality of members extending radially out from a central cylinder that extends crosswise of the harvester, said spinner lying close to said forward end so as nearly to mesh with said flight bars thereof and to be spaced apart from said other bars by a gap which at a maximum is no wider than the size of the fruit which is to be harvested, and,
    means for rotating said spinner so that its upper half moves rearwardly and directs material between the forward end of the conveyor and the assist means,
    whereby said spinner makes contact with said row crop and lifts it on to said conveyor front end in between said conveyor and said assist means, while dirt carried over by the spinner drops into the gap between the spinner and the conveyor.

8. The device of claim 7 wherein the means for rotating said spinner comprises means for driving said spinner at approximately one-half the speed of the conveyor.

9. The device of claim 8 wherein the conveyor has means for moving it substantially at the ground speed of the harvester in the opposite direction from the ground speed of the harvester, so that the spinner is moved at approximately one-half of the ground speed of the harvester.

10. The device of claim 7 having means for varying the height between said spinner and said forward end, according to ground conditions.

11. The device of claim 10 wherein spring means is provided for tending to restore said spinner to a lower set position, while enabling it to rise against the pressure of the spring to a fixed limit depending upon the ground-resisting conditions.